(12) United States Patent
Siessegger et al.

(10) Patent No.: US 11,622,434 B2
(45) Date of Patent: Apr. 4, 2023

(54) LIGHTING FIXTURE AND ARRANGEMENT HAVING AT LEAST ONE LIGHTING FIXTURE

(71) Applicant: OSRAM GmbH, Munich (DE)

(72) Inventors: Bernhard Siessegger, Unterschleissheim (DE); Christoph Peitz, Lippstadt (DE); Markus Jung, Feldkirchen (DE)

(73) Assignee: OSRAM GMBH, Munich (DE)

( * ) Notice: Subject to any disclaimer, the term of this patent is extended or adjusted under 35 U.S.C. 154(b) by 269 days.

(21) Appl. No.: 17/149,798

(22) Filed: Jan. 15, 2021

(65) Prior Publication Data
US 2021/0227671 A1 Jul. 22, 2021

(30) Foreign Application Priority Data
Jan. 17, 2020 (DE) .................... 10 2020 200 525.7

(51) Int. Cl.
*H05B 47/16* (2020.01)
*H05B 47/175* (2020.01)
*H05B 47/115* (2020.01)

(52) U.S. Cl.
CPC ........... *H05B 47/16* (2020.01); *H05B 47/115* (2020.01); *H05B 47/175* (2020.01)

(58) Field of Classification Search
CPC ..... H05B 47/16; H05B 47/115; H05B 47/175
See application file for complete search history.

(56) References Cited

U.S. PATENT DOCUMENTS

| 10,652,966 | B2* | 5/2020 | De Wilde | H05B 47/19 |
| 2009/0026978 | A1* | 1/2009 | Robinson | H05B 47/175 |
| | | | | 315/294 |
| 2015/0076993 | A1* | 3/2015 | Mohan | H05B 47/11 |
| | | | | 315/153 |

(Continued)

FOREIGN PATENT DOCUMENTS

| DE | 102016104486 A1 | 9/2017 |
| DE | 102016125684 A1 | 6/2018 |
| DE | 112017003157 T5 | 3/2019 |

OTHER PUBLICATIONS

German Search Report based on Application No. 10 2020 200 525.7 (8 pages) dated Jul. 27, 2020 (for reference purposes only).

*Primary Examiner* — Alexander H Taningco
*Assistant Examiner* — Pedro C Fernandez
(74) *Attorney, Agent, or Firm* — Viering, Jentschura & Partner mbB

(57) ABSTRACT

A lighting fixture includes an optoelectronic light source, for example, designed to illuminate a room, and a modulatable supply circuit that is connected to the optoelectronic light source, wherein a current through or a voltage applied to the light source may be modulated by the modulatable supply circuit. A data stream generator is connected to a modulation input of the supply circuit. A trigger element that is connected to the data stream generator and configured to deliver a first signal to the data stream generator in response to a comparison of a counter value with a threshold value and an event signal. The data stream generator may be configured to deliver a modulation signal to the modulation input in response to an event signal and to the first signal, and the modulation signal encodes position information relative to a reference point.

18 Claims, 3 Drawing Sheets

(56) References Cited

U.S. PATENT DOCUMENTS

| | | | |
|---|---|---|---|
| 2017/0127497 A1* | 5/2017 | Baek | H05B 45/24 |
| 2018/0138945 A1* | 5/2018 | Kearney | H04B 3/54 |
| 2018/0331757 A1* | 11/2018 | Breuer | H04B 10/40 |
| 2019/0305821 A1 | 10/2019 | Kearney et al. | |
| 2020/0245424 A1* | 7/2020 | Stout | H05B 47/19 |

* cited by examiner

LIGHTING FIXTURE AND ARRANGEMENT HAVING AT LEAST ONE LIGHTING FIXTURE

REFERENCE TO RELATED APPLICATIONS

This application claims priority under 35 U.S.C. § 119 to German Application No. 10 2020 200 525.7 filed on Jan. 17, 2020, the contents of which are incorporated by reference in their entirety.

TECHNICAL FIELD

The disclosure relates to a lighting fixture and an arrangement having at least one such lighting fixture. The disclosure also relates to a method for transmitting position information.

BACKGROUND

Position information, such as in the well-known navigation systems which evaluate a GPS or similar signal, is commonly used for a wide variety of applications. However, GPS signals have the disadvantage that they may not be received, or only inadequately, within buildings, such as factory buildings or similar. This has led to the development of other methods for use in closed spaces, which allow positioning or localization based on radio-based systems. Such applications are sometimes referred to as "Location as a Service", a system with which position information is made available to a third party on a paid basis. This position information may be used, for example, in autonomous vehicles or within automated production lines.

In the following, however, a focus may not be on the position or coordinates of objects or persons, but the possibility that they may localize themselves. In this respect, the requirement is not merely one of transmitting position information, but of providing a localization infrastructure instead. This should be flexible in terms of its functionality, so that, depending on need, for example, a temporal control for the transmission of such position information is possible.

SUMMARY

In accordance with the present disclosure, an infrastructure is provided in which position information is delivered by means of a modulation of light. For this purpose, for example, the current or the supply voltage of light sources, for example, those used for illuminating a room, is modulated slightly so that they may be evaluated by a suitable receiver. In addition, the present disclosure allows this position information to be transmitted selectively according to needs and requirements. The transmission of such information may be time-limited. Suitable measures may limit the duration of such a localization solution and thus create the foundations for different payment and business models without restricting the primary function of the light sources, namely the illumination of a room. In this context, the term "time limitation" does not mean that the position information is transmitted continuously or periodically, but that the transmission is ceased completely when a defined event occurs, provided that the transmission is not prolonged by a user. The defined event may be a specific point in time and/or the expiry of a certain time period and/or the presence of a predefined number of transmitted position information items.

In addition to position information, the light sources may therefore also be used for communication, i.e. communication in general which involves the use of any data from the lighting fixture according to the disclosure, which transmits this data as a data transmitter to one or more data receivers located in the illuminated room or irradiated by the lighting fixture. A similar time limitation may be provided for this optical data communication.

One aspect of the present disclosure describes a lighting fixture that contains one or more optoelectronic light sources, for example, LED-based (light emitting diode) or laser-based light sources, which are arranged in one or more lamps. For example, the light source may be a rail-mounted lighting system (often referred to as a "trunking system"), to which the supply voltage is fed at its "head end" and which contains a plurality of lamp units or lamp inserts. The one or more lamps of the lighting fixture are designed, for example, to illuminate a room of a corridor or other enclosed structure, and typically contain optical functional elements by means of which the properties of the light produced by the one or more light sources are altered. For example, the optical functional elements in the lamp might direct or homogenize the light produced, or alter its color and spatial distribution. A supply circuit is connected to the optoelectronic light source to supply it with power. The supply circuit may be modulated by a corresponding modulation signal. A modulatable supply circuit here means that the current provided by the supply circuit or the voltage provided by the supply circuit and applied to the light source may be modulated in its phase, frequency or amplitude. In designing the modulation, care should be taken to ensure that no significant frequency components are included between 450 and 3 Hertz, for example, between 50 and 5 Hertz, in order to avoid an unpleasant flicker impression and/or the risk of epileptic seizures in persons in the illuminated room. For example, when using a phase or frequency modulation of the supply current or the supply voltage, the intensity of the illumination may be kept constant. In the case of amplitude modulation, the modulation depth may be less than 15%, for example, less than 5%, for example, in the range from 2.5% to 3.5%. As a result, a user or other person does not perceive the modulation of the optoelectronic light source as unpleasant. At the same time, such a modulation depth is sufficiently large to be detected and processed in a receiver after a DC filter stage for removing the DC component, which may be implemented in a simple design by a capacitor for blocking the DC voltage.

The lighting fixture according to the present disclosure also includes a data stream generator, which is connected to the modulation input of the supply circuit.

A trigger element is connected to the data stream generator and is designed to deliver a trigger signal to an input. The trigger signal and/or a first signal of the trigger element is provided in response to a comparison of a counter value with a threshold value and/or an event signal. The data stream generator is thus designed to deliver the modulation signal to the modulation input in response to the trigger signal. The modulation signal may encode position information relative to a previously defined reference point. In one aspect, the modulation signal encodes position information relative to a previously defined reference point precisely when the counter value has not yet reached the threshold value.

By appropriately positioning the lighting fixture within a closed environment, an exact localization within the closed environment may be achieved by means of the position information supplied by the lighting fixture. The position information may not be provided by the trigger element continuously, but only when a corresponding trigger signal is present. Due to its dependence on a counter value, this trigger signal is designed in such a way that different payment or business models are possible. As mentioned above, the trigger signal may be provided periodically so that the lighting fixture emits the localization information at these times. After a predefined number and/or expiry of a certain period of time and/or at a certain time, the trigger signal is stopped, so that in this context the lighting fixture may be used for lighting purposes but not for positioning or data transmission by means of light.

In addition, the trigger signal is controlled by one or more event signals. For example, an event signal may also be used to switch the trigger signal selectively on or off for modulating the lighting fixture. This may be particularly expedient in order to transmit the position signal as required. For example, if no person or user for this position information is within range of the optoelectronic light source, no information is encoded in the light of the light source.

This means that the lighting fixture provides a visible light-based localization solution, in which a light modulated with a position or position information and, if appropriate, additional information, is provided for a limited period of time. Even after the period has elapsed or no trigger signal has occurred, the lighting fixture is still functional, so that it may no longer be provided.

In one aspect, the trigger element includes a counter that provides the counter value. After each trigger signal, this counter is changed by a fixed value. For example, the counter may be an up or down counter that blocks the trigger signal when a defined threshold value is reached. This allows the number of transmissions of position information to be limited to a predefined value. The counter may also be reset, so that, for example, depending on the payment or business model, it is possible to start transmitting the position information again.

Alternatively, the trigger element may also include a timing circuit, which outputs the counter value at regular predefined times. This allows the circuit to control the transmission of position information at specific times. In addition, the timing circuit may also be set to prevent further transmission of position information when a predefined period of time or a predefined time is reached. Like the counter, the timing circuit may also be resettable.

As another alternative to a timing circuit, a timer may be provided for supplying the event signal. This generates the event signal periodically, so that the position information is broadcast at regular time intervals by the modulation of the lighting fixture.

The different parts of the trigger element may be embodied as software or hardware. For example, the counter and/or timing circuit may be implemented in software.

In some configurations of the lighting fixture, the data stream generator is designed to deliver a modulation signal to the modulatable supply circuit based on position information to be transmitted. However, the modulation signal may encode any kind of data content. In an example, the modulation signal includes a predefined data block. Thus, a modulation of the light generated by the light source allows different information from the position information to be transmitted. For example, the serial number of the lighting fixture, or another unique identification number or code within the building, for example, may be selected as the predefined data block instead of the relative position information as the predefined data block. In the course of commissioning or installing the lighting fixture, or the lighting system formed from one or more lighting fixtures, a unique assignment of the serial number or code to the relative position of the lighting fixture is performed, which is then typically not stored in the lighting fixture but, for example, on a server. During operation, persons or objects that receive the serial number may then determine the relative position of the light fixture by means of a request to the server. It may therefore ultimately be irrelevant to the application of the lighting fixture according to the disclosure whether the relative position is transmitted directly, or a serial number or code.

Furthermore, the modulation signal may also encode position information relative to a reference point, but this is less accurate than the original position information. This allows different resolutions with regard to the position information to be obtained.

In some aspects, the modulation signal is provided with a digital modulation. Examples of this would be an ASK (Amplitude Shift Keying) signal, which switches between two amplitude values. A QAM (quadrature amplitude modulation) or a multi-valued ASK are also suitable, so that the different modulation values or symbols encode multiple bits. OFDM (Orthogonal Frequency-Division Multiplexing) is, for example, suitable for achieving high data rates and robust data connections. In general, however, any digital or even analogue modulation type is suitable. The first is useful when elements of the trigger element and the data stream generator are implemented in software or have a high degree of integration. A PWM modulation is also suitable, wherein the actual information may be encoded at different modulation depths. For example, a periodic PWM signal with an on/off ratio of 50% carries no information, while a PWM signal of 60% stands for "1", for example, 40% stands for "0".

In some aspects, the data stream generator is designed in such a way that if the first trigger signal is absent, or in response to a second trigger signal, a specific signal will be delivered to the modulation input of the supply circuit. If no trigger signal is present, the supply voltage or the supply current may not be modulated, i.e. should be constant, so that light with constant properties, such as brightness, color, etc., is produced by the optoelectronic light source, which may, for example, be used for lighting but not for positioning or data transmission by means of the data or information present in the light.

This may also be achieved, for example, by using an unmodulated signal, e.g., a null signal, as a modulation signal. The term "null signal" means a signal with a constant amplitude, for example, the amplitude zero, which means that this signal is absent in practice. Alternatively, a constant modulation signal may also be used, i.e., one with a constant defined data content. In the above example with the PWM signal, this would be the signal with 50% on/off ratio.

For temporary storage, the data stream generator may include a memory in which the position information or additional information may be stored. Position information and the additional information may be stored in the memory permanently or temporarily. In addition to the aforementioned data blocks for communication by means of light, identification data for the identification of the lighting fixture are also possible as additional information. In addition, the data stream generator may include a memory with a fixed predefined data stream. Alternatively, a generator may also be provided for generating such a data stream. The data stream, which may be already permanently defined during the manufacture of the lighting fixture, may be used whenever no position or other information is transmitted. The fixed predefined data stream is also expedient when information items other than the position information are to be transmitted to a user. For example, the fixed predefined data stream may be used to indicate that a period of time or a specified time or any other event has passed, after which position information is no longer transmitted.

Another aspect relates to the possibility of communication between the lighting fixture and externally coupled elements. In one design, a communication interface is provided that is coupled to the data stream generator and designed to receive a data stream fed to the lighting fixture. The communication interface may be coupled to the data stream generator to forward the received data to the data stream generator, which outputs it or a part of it to the modulation input as a modulation signal. The communication interface may also be connected to it to set a counter present in the trigger element to a predefined value in response to an external reset signal fed to the communication interface, or to specify a time to a timing circuit present in the trigger element.

The communication interface uses a protocol to communicate with the externally coupled elements. In this way, the lighting fixture may be connected to a cloud or a server. In some designs the communication is encrypted, in which case mutual authentication of the communication partners may also be implemented. This allows the server to send an encrypted request to the lighting fixture to change the threshold or the counter value. On expiry, before or after this, the lighting fixture or the trigger circuit may thus be "reset", so that position information and/or other types of information may continue to be transmitted.

Another aspect concerns the generation of the event signal. In some aspects, an event generator may be provided to generate the event signal. This may contain a timer for providing the event signal periodically. The event generator may also include a motion detector or proximity sensor, which provides the event signal when the distance of an object or person from the light fixture falls below a defined value, or provides this event signal periodically in combination with the timer as long as a defined distance of an object or a person from the lighting fixture is undershot or in motion. As a result, position information may be output during the approach and when the threshold value has not yet been reached. The event generator may also include one or more light barriers, so that the event signal is provided in response to an interruption. As a further option, the event generator may be connected to a communication means. This may receive a request, so that the event signal is provided in response to this request for position information.

One aspect therefore relates to an arrangement having at least one lighting fixture according to the present disclosure, wherein each of the at least one lighting fixtures includes position information relative to a reference point, or a number or code which may be converted into position information relative to a reference point. The arrangement also includes a data processing arrangement, which may be implemented as a cloud or cloud infrastructure which is coupled to each of the at least one lighting fixtures for transmitting the threshold value. This allows a plurality of lighting fixtures to be selectively controlled. Communication between the data processing arrangement and each of the lighting fixtures according to the disclosure is encrypted, the transmission of the threshold value and/or any other transmission from the data processing arrangement to the at least one lighting fixture, for example, encrypted following successful mutual authentication.

Another aspect relates to a method for transmitting position information by modulating a supply current or a supply voltage of a lighting fixture. Among other steps, the method includes one of detecting an event signal which indicates a transmission of position information. In response to this event signal, an evaluation is made as to whether a trigger condition is satisfied. The trigger condition may include a check as to whether a counter value has not yet reached a threshold value or has not yet exceeded or fallen below it. Alternatively, the trigger condition may also include a check as to whether a certain time has not yet been reached or has already been exceeded.

If the trigger condition is satisfied, a supply current or supply voltage for the lamp is modulated. This modulation is selected in such a way that it encodes data and the data contains position information. On the other hand, if the trigger condition is not satisfied, a modulation of a supply current or a supply voltage may be prevented. In this case, the lighting fixture may only perform the illumination of a room or an enclosed environment without transmitting information or data by modulating the light intensity. Alternatively, the supply current or the supply voltage of the lamp may be modulated with a predefined modulation. The predefined modulation corresponds to an encoded or a fixed, predefined data stream.

The specified data stream may be used to inform a user that the above-mentioned trigger condition is not satisfied. This gives a user the option of signing up to a contract or subscription, or extending an existing contract in order to continue receiving position information.

One aspect of the method now concerns the emission or transmission of the position information. A permanent or continuous transmission is not mandatory in some applications. For example, the transmission of position information may not be necessary if there is no object or person located in the detection range of the lighting fixture that requires position information. Accordingly, it may be provided to generate the event signal when an object or a person approaches a region covered by the lamp. Similarly, an interruption of a light barrier, or opening a door or the like, may cause such an event signal. As another alternative, it is possible to generate the event signal when a request for the transmission of a position information is made. In simple examples, such an event signal is produced either when a defined time has been reached or after a specified time period has elapsed. In response, the trigger condition is checked. If the trigger condition is satisfied, a counter value may also be changed by a fixed value. In this way, it is possible both to track the number of position information items transmitted, and also to achieve a temporal or numerical limitation of the transmission of position information.

The description and the specific examples discuss various aspects to illustrate the present disclosure. Persons skilled in the art will understand from the guidance in the present disclosure that variations and modifications may be made within its scope.

It is therefore understood that the content disclosed herein is not limited to the specific components of the devices described or steps of the methods described, since any such device and such method may vary. It is also understood that the terminology used herein may be intended to be used for the purpose of describing particular aspects and may not be intended to be restrictive. It should be noted that, as used in the description and in the claims, the definite and indefinite articles are intended to mean that there is one or more of the elements, except where the context expressly dictates otherwise. For example, the reference to "a unit" or "the unit" may include multiple devices and the like. In addition, the words "comprise", "comprising", "containing" and similar formulations are not intended to exclude other elements or steps.

BRIEF DESCRIPTION OF THE DRAWINGS

In the following, the lighting fixture and arrangement described herein are explained in more detail in conjunction with non-limiting aspects and the associated figures.

The figures and the proportions of the elements depicted in the figures relative to each other are not to be considered as true to scale. Rather, individual elements may be displayed in an exaggeratedly large format for better presentation and/or comprehensibility.

DETAILED DESCRIPTION

Figure 1:
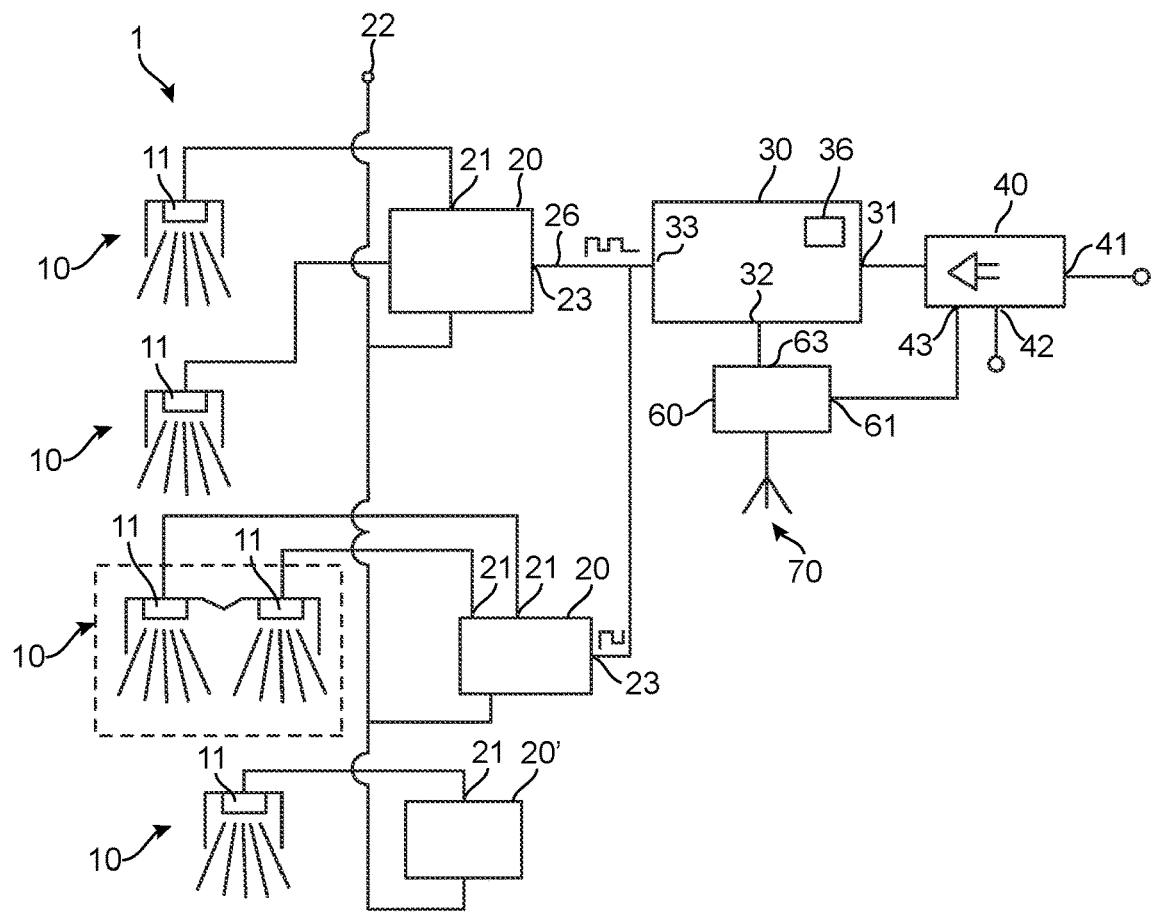
FIG. 1 shows a first design of a lighting fixture according to the present disclosure.

FIG. 1 shows a first design of a lighting fixture 1 according to the proposed principle. The lighting fixture 1 includes at least one lamp 10. This lamp 10 includes at least one optoelectronic light source 11 and is accommodated in a common housing with other elements of the lighting fixture 1, such as an optical reflector. The lighting fixture 10 is connected to a supply output 21 of a modulatable supply circuit 20. The supply circuit converts the supply voltage at the input 22 into a voltage for the at least one optoelectronic light source. It contains, for example, a step-down converter, a voltage-matching rectifier (AC/DC converter) or similar device. The supply circuit may also be switched on or off externally (not shown here) to operate the lamp. However, this functionality is realized in this non-limiting, exemplary aspect by the other elements that form a controller circuit.

A control input 23 is connected to a modulation output 33 of a data stream generator 30. A control or modulation signal may be fed to the control input 23. The modulation signal regulates a supply voltage or supply current for the lamp. In response to the modulation signal, for example, the light amplitude of the lamp changes. This change may be detected and evaluated by a sensor, allowing data to be transmitted.

The modulation signal is generated by the data stream generator and may be formed as a digital or analog modulation signal. For example, it may be a PWM signal, the on/off ratio of which sets a brightness. In addition to controlling the amount of light (for example, depending on an ambient brightness), data may also be transmitted via a change or modulation of the pulse width. The resulting rapid amplitude change may be detected and evaluated without adversely affecting the other functionality. The modulation depth of the emitted light may be small and may amount to a few percent.

In addition, other digital modulation types are also conceivable, including ASK, QAM or even OFDM signals. AM or FM are both suitable as analog modulation types.

The data stream generator 30 includes a memory 36, in which position information is stored. In response to a trigger signal at the trigger input 31, this position information is converted into the modulation signal and transmitted to the supply circuit via the modulation output 33. The data stream generator thus generates the modulation in response to the trigger signal.

The trigger signal is provided by a trigger element 40. For this purpose, the trigger element compares a counter value with a threshold value. The comparison is carried out at periodic intervals, and is specified by an event signal at the input 41 or triggered by this event signal. A clock signal is present at the input 42 for this purpose. If the threshold value has not yet been reached, the trigger element 40 generates the trigger signal. In this design, the counter value is incremented by a value for each execution and hence each time the position information is emitted, until the threshold value is reached. From this point on, no further trigger signal is generated even if a fresh event signal is applied.

The trigger element 40 is also connected to a communication interface 60 via the data output 61 to a data input 43. The counter value or the threshold value may be set to a value via the data input. This means, for example, that the transmission of position information may also be extended or restarted. The communication interface 60 is connected to an antenna or an interface 70, via which data and/or instructions may be sent to the lighting fixture. Data may be sent from the communication interface 60 via the data output 63 to the data stream generator 30. The data stream generator receives this at its data input 32 and uses it to generate a modulation signal. This allows information to be sent to a user via e.g. a modulation of the light intensity of the lamp 10.

Figure 5:
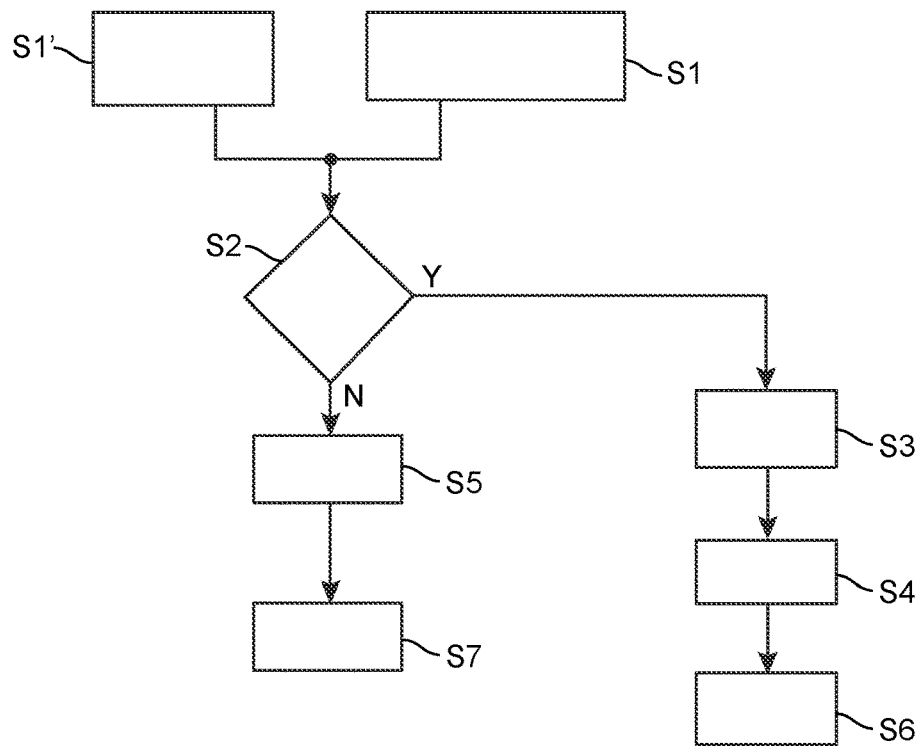
FIG. 5 shows a first design of a method according to the present disclosure.

An example of a method in which position information is send at the request of a user is shown in FIG. 5. In step S1, the communication interface 60 receives a request for transmission of position information. The request may come from an object such as an autonomous vehicle, or a user. Items being transported from one place to another may also send such requests.

In another example, in step S1' such a request comes in the form of a triggering event. For example, the event signal is generated by a proximity sensor, a light barrier, or similar.

This request is forwarded to the trigger element 40. In step S2, the trigger element checks whether such a transmission is possible. For this purpose, for example, a counter is evaluated and the counter value is compared with a comparison value by means of a comparator circuit. Alternatively, the comparison circuit checks whether a certain period of time has not yet elapsed or whether a certain point in time has not yet been reached. The comparison circuit may be implemented in hardware or software. If the trigger element comes to the conclusion that transmission of the position information is possible, in step S3 it generates a first trigger signal and sends this to the data stream generator. At the same time, it may increment the counter in step S4. If, on the other hand, the trigger element concludes that it is not possible to transmit position information, then in step S5 it generates either a second trigger signal or else no trigger signal.

The data stream generator now receives the first or second trigger signal. In the case that no trigger signal is generated, the data stream generator does not respond. In response to the first trigger signal, step S6 is executed by the position information being read from the memory 36 and a modulation signal being generated from it. In response to the second trigger signal, on the other hand, step S7 is executed. In this case, a fixed predefined data stream is read from the memory 36 and a different modulation signal is generated from it. The latter indicates to a user that although the request for position transmission has been received, it is impossible to execute. A user may thus be informed that, for example, their subscription or contract has expired.

Figure 2:
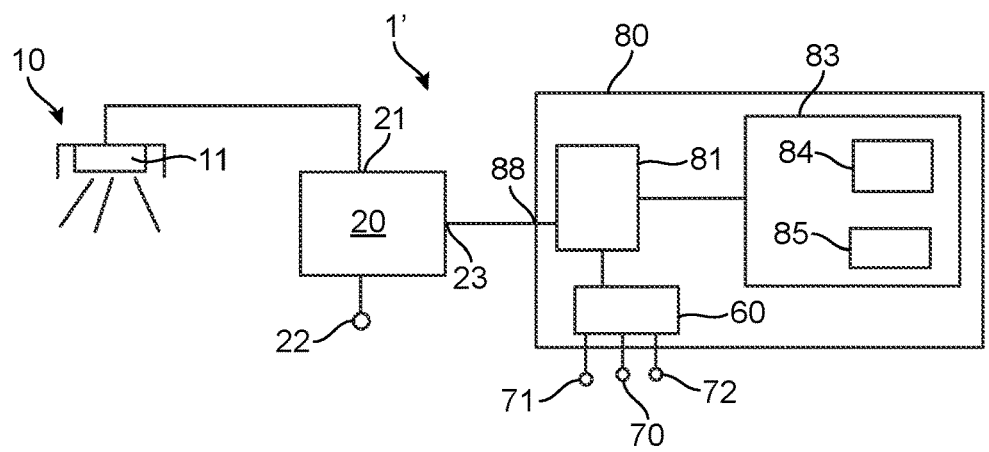
FIG. 2 shows a second design of a lighting fixture according to the present disclosure.

FIG. 2 shows a further example of a lighting fixture. In this design, features are implemented in software that is executed by a processor. The lighting fixture 1' also in turn includes a lamp 10 and a supply circuit 20 connected thereto for controlling the optoelectronic light source 11 located in the lamp 10. The supply circuit 20 has a control input 23 which is connected to a control output 88 of a controller circuit 80.

The controller circuit 80 contains one or more processors 81 as well as a memory 83 and a communication interface 60. The communication interface has different connections 71 and 72 for feeding in sensor data, and also to a gateway 70 or similar device. The sensor data is provided by various sensors, as already mentioned.

The processor is designed to execute program code stored in the memory and in doing so to implement functions of the trigger element and the data stream generator. The memory contains different types of code in the region 84, as described below, along with the position information, an identifier for the lighting fixture and other data in the region 85. This region also stores the counter value, the threshold value or another relevant parameter, which may be used for deciding whether position information is to be transferred. Therefore, the region 85 may also be specially protected, e.g. write-protected or encrypted, which, for example, appropriately restricts or completely prevents the "external" writing and/or writing, i.e. from outside the lighting fixture accordingly, but does not restrict the processes internal to the lighting fixture.

During operation, the processor 81 checks whether certain events have occurred that may be necessary for the transmission of position information. For example, the processor has a built-in clock and also implements a counter that is incremented or decremented by a value each time position information is transmitted. In this implementation, position information is transmitted for a short time at periodic intervals, e.g. every 2 seconds for one minute, if a time has not yet been reached and/or the counter has not yet reached the threshold value.

To do this, as disclosed in the previous examples, the processor evaluates the sensor data or other events in order to make a decision for the transmission of position information. In this implementation, the position information may be transmitted on request or if an event occurs. However, this may only apply until a time is reached or a certain number of position information items has been transmitted. After the time has expired or the specified number is reached, a reset may be carried out, which a user may only initiate by renewing their contract, for example.

Figure 6:
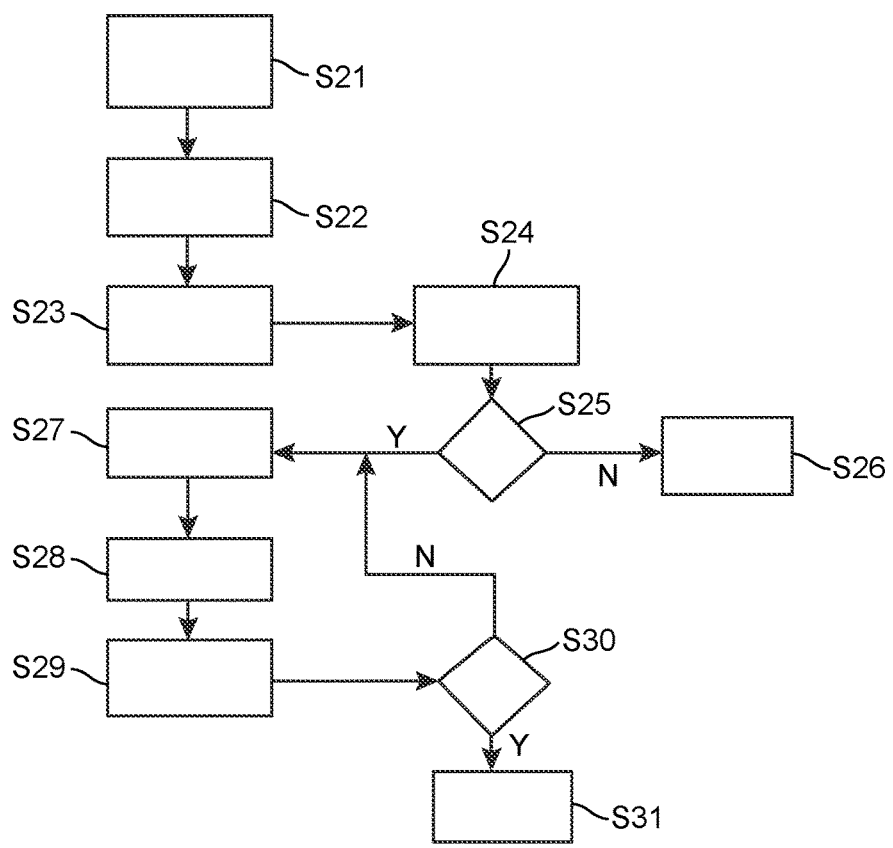
FIG. 6 shows a second design of a method according to the present disclosure.

An example of a method for resetting the counter or selecting a new time is shown in FIG. 6. In step S21, the lighting fixture issues a query to the server as to whether a revaluation request is available. The server is a data processing arrangement including at least one processor and a rewritable but non-volatile memory, which in turn may be designed as part of a larger data processing arrangement, for example, a cloud or cloud infrastructure. In this respect, the server may also run as a "virtual server" on a cloud. For example, the lighting fixture or the processor may carry this out shortly before a time period expires, or if the difference relative to the threshold value falls below a value, i.e. a transmission may only be possible a few more times. Alternatively, the request may also be generated by the server and used to prepare the device for the subsequent communication. It is similar to a heartbeat request or a status query of the lighting fixture. If the lighting fixture exchanges such information with the server at periodic intervals anyway, such a step may not be necessary.

The identification key, also referred to as the device key, which may also be stored in the lighting fixture, may be known to the server. The key may be stored—as part of the so-called "Pre-Shared Key Approach"—during the production of the lighting fixture. The identification key may be used to initialize an encrypted communication in a following step S22. This may be carried out in this design by initiating the processor of the lighting fixture. After a successful initiation of an encrypted communication, the lighting fixture processor sends a "revaluation query" to the server in step S23. In addition to a unique identification of the lighting fixture, this query may contain the current status or the remaining value of the credit counter or the remaining term, an operation number (also known as the transaction number) generated by the server, and possibly the transaction number of the last successful transaction, i.e., the last successful credit counter revaluation. If the status or an estimate of the credit counter reading or remaining term is known to the server or may be determined, the latter may also carry out a plausibility check to reduce manipulation attempts. The transmission of the current transaction number and the transmission of the last successful transaction number are used to continue the method if an interruption in communication occurs during the revaluation.

The processor may also temporarily store this information in the memory. This may allow it, on the one hand, to cancel the transaction or to check the correctness of all information before data is written back into protected memory areas.

In step S24, the server checks the correctness from the information transmitted and verifies the lighting fixture. The server may know a current, or at least almost current, reading of the value or values of the lighting fixture, i.e. the credit counter or the clock. This allows the server to perform a plausibility check. For example, if the transmitted counter reading and the counter reading known to the server differ significantly, such that this difference may not be explained by additional position transfers or tolerances in the time constancy of the clock or similar, this may be an indication of redirection or a manipulation attempt.

If the check in S25 results in doubt, the method may be aborted or restarted in step S26. Otherwise, the method may be continued in step S27 by the server sending a "token" to the lighting fixture. The token contains the process or transaction number as well as additional data. Additional data may also include, for example, a checksum, for example, a CRC (Cyclic Redundancy Check) checksum of the instruction to be derived by the lighting fixture. This data contained in the token is either encrypted or processed with the current reading of the counter. Together with data in the lighting fixture memory (e.g. the counter value transmitted in the request step S23 or the time transmitted), they provide an executable instruction for changing or resetting the counter value, changing the clock time, or another parameter.

The processor of the lighting fixture checks the transmitted data and the instruction derived from it in step S28. If together with the temporarily stored results this delivers a plausible result and would not cause an error, and if a CRC check was successful, the instruction may be assumed to be correct and the processor executes it and thus changes the corresponding value or values in the protected memory area.

To confirm the successful evaluation, the lighting fixture processor sends the transaction number back to the server in step S29. In step S30, the server periodically checks the receipt of this confirmation. If the confirmation is not provided within a specified period of time, the server may continue with step S27, i.e. sending the token again. This step may be repeated multiple times until the server terminates it. If step S30 was successful, i.e. the confirmation was received by the server, then in step S31 the server marks or saves the transaction or transaction number as a successful transaction.

If the next time the processor of the lighting fixture connects to the server, the server may use the transmitted transaction number to check whether the step mentioned above was still successful despite being cancelled after several attempts. For this purpose, for example, not just one but multiple previous transaction numbers may be transmitted. If the processor correctly transmits the last z transaction numbers to the lighting fixture, but these do not correspond to the last transaction numbers but instead to the last z+1 transaction numbers, with the last one missing, the transaction is executed again from step S29.

Another approach is transmission by means of two-channel communication. Some of the different method steps and the communication with the server may not be carried out via the communication interface but via the light source, by means of a modulation of the supply current or the supply voltage. This is expedient when an object or user is requested and the user also has an additional communication interface. The object or the user establishes a communication with the server via the additional communication interface. Thus, the connection for recharging or resetting the counters or clock in the lighting fixture may be split into two communication channels, a communication connection from the lighting fixture "directly" to the server and another connection from the lighting fixture via the optical communication to the object or user to the server, which makes eavesdropping or manipulation more difficult.

Figure 3:
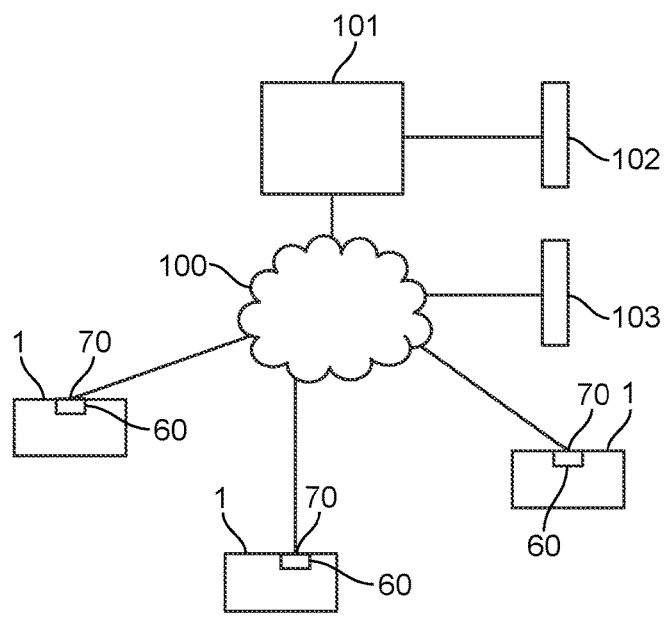
FIG. 3 shows a design having a plurality of lighting fixtures according to the present disclosure.

FIG. 3 shows an arrangement with a plurality of lighting fixtures 1 connected to a network 100 and to a server 101 via their respective communication interfaces 60 with connections to the network 70. The individual lighting fixtures 1 have an interface 60 with connections to the network 70, via which communication with the server 101 is implemented. In this non-limiting, exemplary aspect, the interface 60 is a wired interface, the communication via this wired interface being carried out by a predefined protocol. For example, each lighting fixture 1 is connected to the power supply of a building. The power supply lines may be used to communicate with a PLC router, not shown here, and then with the network 100 ("power line communication"). The lighting fixtures also have an identification according to the IPv4 or IPv6 protocol, which allows them to connect to the network 100 and the server 101 via the TCP/IP protocol or other protocols.

A user terminal 102 is connected to the server 101 via an additional interface. A user may use the user terminal 102 to query various information from the server 101 and the individual lighting fixtures 1 or send instructions to them.

For this purpose, the lighting fixtures 1 communicate with the server 101 via their interface 60 and the network 100 and transmit data. This includes, for example, status information, data on the frequency of a position information query or a frequency of switching the respective lamp on or off. It may also be used to query the power consumption, the duration of illumination, temperature, ambient brightness or surrounding brightness, and other information.

It is also possible for a user to configure the lighting fixtures using the user terminal 102. Alternatively, this configuration may also be implemented by means of a user terminal 103, for example, by a PC (personal computer), which is connected to the server via the network 100. Using different payment or contract models, the transmission of position information may thus be activated, extended or even switched off for individual lighting fixtures or lamps in a building, or even for all lighting fixtures or lamps. For this purpose, for example, a user selects a time up to which the lighting fixtures may transmit position or other types of information. Alternatively, a volume model may be chosen that specifies the quantity per unit of time or specifies the absolute quantity.

The request is transmitted from the server 101 to the lighting fixture and a threshold value in the respective lamp is set to the corresponding value. A counter—also called a credit counter—within the lighting fixture 1 determines the number of position information items that the respective lighting fixture has transmitted. If the counter has not yet reached the threshold set by the server due to a user request, the lighting fixture continues to transmit position information or other data.

In addition, the communication between the lighting fixtures and the server is also used to indicate low remaining values or a low remaining term to a user. This allows a user to be alerted in good time to the fact that the permitted number of transmissions of position information is about to be reached, or a possible contract or subscription is about to expire.

Figure 4:
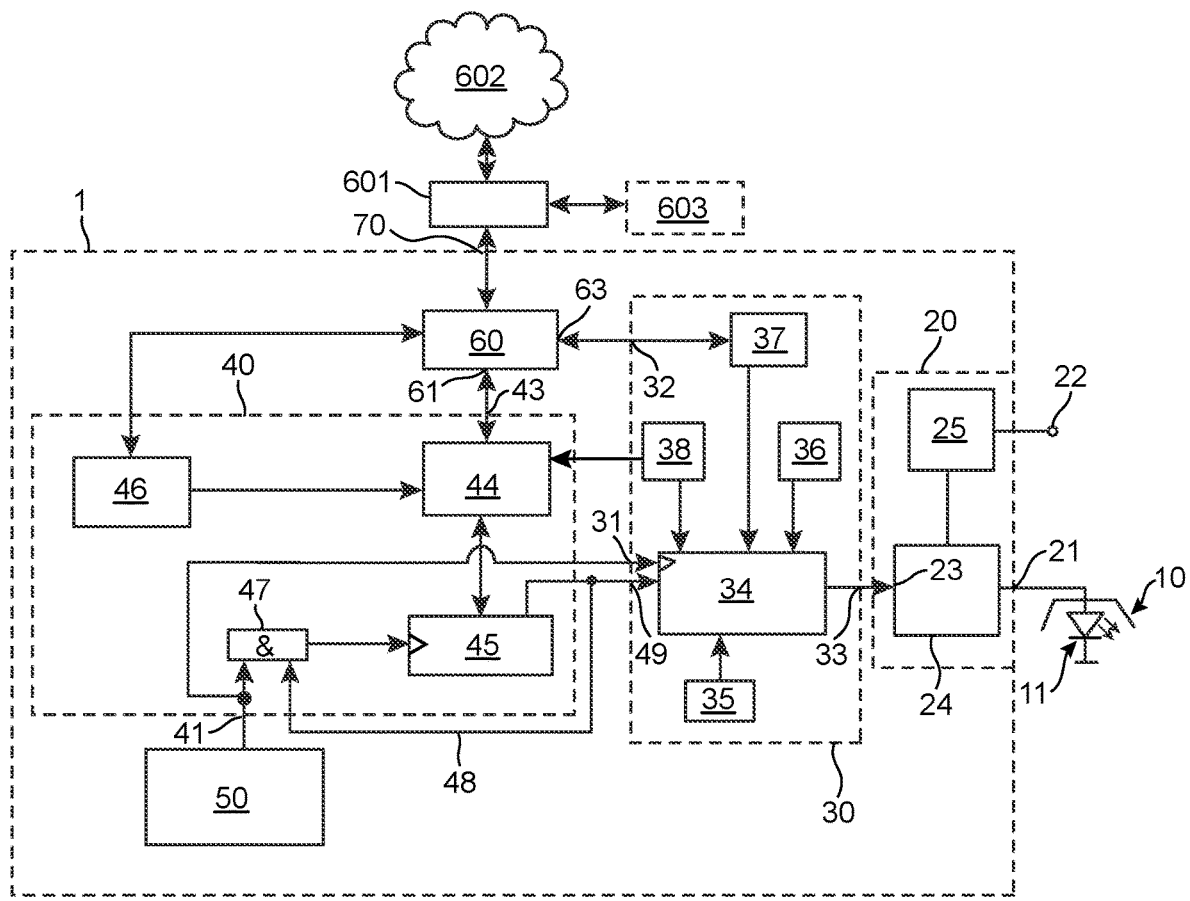
FIG. 4 shows a detailed design of a lighting fixture according to the present disclosure.

FIG. 4 shows a detailed design of the lighting fixture with a connected gateway and network for bidirectional communication. As in the preceding examples, the lighting fixture 1 includes a lamp 10 with an optoelectronic light source 11 connected to a supply output 21 of a supply circuit 20. The supply circuit 20 may be modulated and has a modulator 24 and a converter 25. The converter 25 connected to the modulator converts a line voltage 22 to a supply voltage for the lamp. In the example case of a line voltage of 48 volt DC, the converter 25 is essentially designed as a linear regulator or as a switch-mode DC/DC converter, in the example case of 230V-50 Hz mains AC, the converter 25 is implemented as a switch-mode power supply (or switch-mode AC/DC converter). The supply voltage supplied to the modulator in this way is modulated depending on a modulation signal at the modulation input 23. This changes the light intensity, and/or the color or color temperature, and/or any other parameter of the lamp. These temporal changes may be detected and evaluated by a user, typically his/her devices or apparatus, or by an object contained in the room illuminated by the lighting fixture.

The modulation may include a fixed data stream, so that the lamp follows a predefined modulation. Alternatively, another possible modulation is one which encodes a variable data stream, so that other information may be transmitted via the modulation of the light intensity or other parameters of the emitted light of the lamp 10. A data stream generator 30 is connected to the modulation input 23. The data stream generator 30 includes a plurality of memory elements 35, 36, 37 and 38 connected to an encoder 34. The memory 35 contains a fixed predefined data stream, the memory element 36 the position information, the element 38 a unique identification number and in the memory 37 additional temporarily available data may be stored. The encoder generates a digital or analog modulation from the data supplied to it at its output 33 and applies this modulation to the modulation input 23 of the modulator 24.

An aspect of the lighting fixture of the present disclosure is the trigger element 40, which includes a counter, the credit counter 45, a logic element 47, and a reset generator 44 with a memory 46. The credit counter 45 internally includes a memory, the credit counter word or credit counter register. The respective bit string of the credit counter word reflects the value of the credit counter 45, the counter reading. The credit counter 45 is connected on the output side to the trigger input of the data stream generator 30. At the same time, the output of the credit counter 45 is fed back to the logic 47. Element 47 may be a simple AND circuit which, when an event is present at the event signal input 41 and with a predefined level at the output of the credit counter, outputs a corresponding signal to the credit counter 45.

In operation, a trigger signal may be generated at the trigger input 31 of the data stream generator 30 by the credit counter 45, which the encoder 34 uses to read the position information from a memory 36 and/or to read the identification number from the memory 38 to generate a modulation word from one or both memory values. This is output to the modulatable supply circuit 20 at the modulation output 33. At the same time, the signal 48 at the credit counter output, which restores the outstanding sequence of the credit counter to zero, may be fed back to the logic circuit 47.

When another event occurs at the input 41, the logic circuit 47 then generates a logical signal if the credit counter is not yet zero, which is forwarded to the credit counter which then decreases its value—that of the credit counter word—by a fixed number. In addition, the additional event at input 41 generates a new trigger signal at the trigger input 31 of the data stream generator 30.

However, if the counter 45 has reached its predefined threshold value, either no trigger signal may be produced or a special trigger signal may be output to the encoder 34. In the latter case, in the implementation shown, the latter recognizes, on the basis of the threshold-value-not-reached signal 48, which is fed to the data stream generator 30 at its threshold-value-not-reached input 49, that the value of the counter has expired and now takes the fixed predefined data word from the memory area 35 and together with the identification number from memory generates the modulation word at its output 33. In some aspects, the threshold value was selected to be constant at zero in the interests of a simple hardware implementation, since in this case the comparison circuit is wired as a simple OR element, the inputs of which are connected to all bits of the counter word of the credit counter 45 which represents the credit, thus generating the credit counter non-zero signal 48, which is fed to the data stream generator 30 at its threshold-value-not-reached input 49. In some aspects, the threshold value is not designed to be constant, but may be modified, for example, by means of the data processing arrangement via the communication interface 60, to the threshold value predefined for the subsequent operation, then this threshold value is stored in a threshold word or threshold register in the trigger element 40 and regularly compared with the credit counter word or credit counter register, which may be carried out by means of an equivalence element (also known as XNOR or exclusive-NOT-OR) or by means of the ALU (arithmetic logic unit) in a processor or in a microcontroller.

The lighting fixture 1 also includes a communication unit 60, which is connected both to the temporary memory 37 and via the data input 43 to the reset generator 44. The communication interface 60 is connected on the output side at the connection 70 to a network 602 or other elements or external devices 603 via a gateway 601. The other devices 603 may also include additional lighting fixtures according to the present disclosure. Further data may also be delivered to the data stream generator via the communication interface 60. Examples of this are status information, the temperature of the lamp, the energy consumption during certain periods, or other parameters dependent on the lamp. On the one hand, this information may be generated by a data word in the data stream generator so that it is modulated onto the supply current as a modulation, on the other hand, this information is also retrievable externally via the communication interface 60. Likewise, data stored in the memory 37 of the communication interface may also be modulated onto the current or voltage for the lamp via the encoder 34.

This enables the light fixture to receive and send bidirectional data. For example, an external device 603 may store information in the temporary memory 37 via the communication interface. When a new event signal is received at the event input 41, the encoder 34 may read this information from the temporary memory and use it as a data stream to modulate the supply current or supply voltage.

In addition, further implementation options are conceivable with the lighting fixture according to the present disclosure. For example, the data stream generator may use the fixed predefined data stream stored in the memory 35 as a default for the modulation of the supply voltage or the supply current. Although this standardized predefined data stream does not transmit information, it may alert a user or the system that a credit balance has been used up and/or a contract for providing position information or other information has expired. As long as the credit is not used up, the current reading of the credit counter 45 may be transferred instead of the contents of the memory 35—the data line required for this from the credit counter to the encoder 34 is not shown in FIG. 4 for reasons of clarity—which includes inter alia a simple determination of the "residual credit" or a simple verification of a successful "recharging" by the user.

In an alternative design, the data stream generator may also transmit further position information when the credit counter has expired. However, this position information that is now transmitted differs in that, for example, it is much less accurate than it would be if the counter had not expired.

Although this does not terminate the functionality, it may nevertheless be significantly limited. To signal that the position information is inaccurate, a corresponding designated "coarse bit" is also generated in the data stream of the encoder 34. After reception and decoding, users or even objects such as an autonomous transport vehicle are informed of the much coarser position information, so that certain actions may no longer be taken. This allows an accuracy of the position information transmission to be controlled. Actions requiring high accuracy, such as moving pallets into or out of a shelf within a production process, are no longer possible with the coarse accuracy. To allow this, a user would need to sign a contract or take out a subscription, which would enable this functionality in the lighting fixture by setting the credit counter 45. Nevertheless, an autonomous vehicle may still be located in a rudimentary way, for example, to drive to a charging station, a parking bay or a safety zone.

The credit counter 45 shown in this aspect is a so-called down counter. Each time position information is transmitted, the counter value of the down counter is reduced by a defined value. Undershooting of the down counter may be prevented by the logic gate 47, since this may output pulses to the input of the credit counter 45 as long as it is non-zero. Alternatively, the credit counter may also be implemented as a clock, wherein it may always generate a trigger signal as long as a fixed time has not yet been reached or a time period has not yet elapsed.

The counter 45 may be recharged via the communication interface 60. This may be carried out from the network by a corresponding request via the communication interface 60 and the interface 601. As already mentioned above, the communication may be at least partially encrypted, and the lighting fixture may contain instructions on how to manipulate the counter 45. These instructions may be transferred from the interface 60 to the reset generator 44, which may reset the credit counter, set it to a fixed value, or increase it by a fixed value taking into account the device key in the memory 46, the fixed value being defined, for example, in each case by the value in the memory 46. The value of the memory 46 may be changed via the communication interface 60, which ultimately allows a "recharging" of the credit counter with "new credit" in variable amounts. Since the credit counter 45 typically has more digits (higher resolution/the counter word contains more bits) than the memory 46 is wide, the reset generator 44 multiplies the memory content of the memory 46 by a constant factor before this fixed value is written to the credit counter 45 by the reset generator 44 as a new counter word, or before this fixed value is added to the current reading of the credit counter by the reset generator 44 and then written to the credit counter as a new counter word. The constant factor may be chosen as a power of two, for example $2^{14}=16,384$, which allows the multiplication to be implemented by a simple shift-left operation (shift operation in the direction of the most significant bit) and no generic multiplication needs to be implemented.

The communication interface 60 is wired or cable-based, for example, via data lines. The protocols implemented for this may be DALI, KNX, Ethernet, MAY, and others. Alternatively or in addition, communication may take place via the mains supply using PLC (powerline communication). In addition, wireless interfaces are also possible, for example, via the 2.4 GHz or 5 GHz ISM bands, as in WiFi. The communication interface 60 may also contain a plurality of wired and/or wireless interfaces. Communication via the lamp 10 is generally carried out wirelessly by means of optical communication using the visible or invisible spectrum.

Another aspect concerns the event generator 50. In one aspect, this is a timer that generates pulses at periodic intervals. Alternatively, sensors may also be used here. For example, a proximity sensor or a light barrier could be conceivable, which generates an event at the event signal input 41 when an object is detected within a region defined by the lighting fixture. In addition, the event generator 50 may also be linked to other parameters, so that it generates a signal, for example, when the lamp of the lighting fixture itself is supplied with power. This ensures that a customer receives transmitted position information when the lighting is on or active, i.e. when they may actually use the position information.

In addition to a purely time-controlled generation of the event, other implementations are also possible. For example, in addition to time, the energy consumed by the lighting fixture may also be invoked. In this case, the power or energy consumed by the lighting fixture is integrated over time until a corresponding threshold is reached. This then causes the generation of an event signal by the event generator 50, wherein at the same time the integration memory is deleted again and the operation is restarted. The integration may be performed digitally by means of corresponding counters and/or by integration using time-determining elements, e.g. RC elements and/or energy-storing components such as capacitors, which are charged by a controllable power source corresponding to the instantaneous luminous power. As a result, a dimmed lighting fixture may use up its credit more slowly than an undimmed one. In addition to relying on the energy consumed or the power converted, it is possible to use the amount of light or luminous flux generated. Since the luminous flux of an optoelectronic light source, in the parameter range relevant to the lighting application, is proportional to the current through the optoelectronic light bulb to a sufficiently good approximation, instead of measuring the emitted luminous flux—for example using a suitably calibrated photo-element—the current intensity of the current provided at the supply output 21 may also be used directly. The latter may enable a less expensive implementation of the event generator 50, not least because typically the current intensity is already available to the current control circuit within the supply circuit 20 as a digital value. The current value of the current intensity may then only be periodically added to the current value of an accumulation register. The periodic activation of the accumulation may be carried out by a clock generator, which is generated, for example, by dividing down the clock of a processor contained in the lighting fixture. When the accumulation register overflows or when a predetermined accumulation upper limit of the accumulation register is exceeded, a corresponding event is generated at the event signal output 41 of the event generator 50. This feature, a reduction rate of the credit that varies with the dimming level of the lamp, may be useful when the lamp is not emitting at full power continuously, but a more conservative lighting plan is in use instead. If the lighting fixture includes a plurality of lamps and/or a plurality of optoelectronic light sources, the cumulative energy consumption, the cumulative amount of light or the time-integrated current (=the charge converted in the optoelectronic light sources) of all modulated lamps or optoelectronic light sources of the lighting fixture is preferably used.

Even when transmitting temporary data from the memory 37 that comes from the communication interface, an event may be generated for a specific amount of data. In this case, the event generator and the credit counter are not designed for a time, but for a volume. After a specified maximum volume, further data transmission may thus be interrupted or minimized by means of a reduced data rate.

In addition to the example of a single credit counter shown here, multiple credit counters with different assigned functionalities may also be implemented. These functionalities may be switched on or off separately via the communication interface 60. Depending on which of the credit counters is charged, the different functionalities are also available. For example, a credit counter could be provided which controls the transmission of position information via its value, while a further credit counter is designed as a timer switch, for example, and is used to control the transmission of temporary data in the memory 37 by means of light.

In other aspects, position information in different resolutions is conceivable. Here also, depending on the resolution, different credit counters may be assigned. Depending on the desired operating mode or requested resolution, for example, only the corresponding credit counter that provides this resolution is decremented. Such an implementation with a plurality of credit counters may be implemented, for example, by hardware as well as by software. The separation between different functionalities also ensures that a customer or user only uses the functionality that they actually need. For example, a customer may intend that data communication via the lamp may only be possible at certain times of the day or on certain days.

This approach may also be used, for example, to read out sensors installed in the lighting fixture or connected sensors, and to transmit the data. Each time a sensor, such as a temperature sensor, daylight sensor, humidity sensor, or a gas sensor is read out and its value is transmitted, the associated credit counter is changed by a fixed value.

Instead of implementing a credit counter in each lighting fixture, the credit counter may also be implemented in the interface 601 to the data processing arrangement 602, sometimes also referred to as a gateway 601. In principle, the task of such an interface in the sense of a decentralized bank with a corresponding credit counter, may also be implemented in the same way by any other component in the field. In this case, the interface 601 replaces the trigger element 40 in terms of authentication, encryption and recharging of the credit counter or counters. The localization functions and other functions of the lighting fixture are switched on or off, the resolution is changed if necessary or further measures are taken by means of corresponding commands from the interface 601.

In this case also, authentication of the different lighting fixtures with the interface 601 is carried out via an encrypted communication. Thus, if the lighting fixture is not logged on to the interface 601, the localization functions remain disabled by default. In some aspects, only after authentication and registration on the interface 601 are the localization function of the lighting fixture and other functionalities enabled. Alternatively, it would also be possible to provide such functionalities in the lighting fixture temporarily for a short period of time. This would prevent the functionality from being switched off or remaining switched off if the lighting fixture and the interface 601 are temporarily unable to communicate due to an interruption of the line or an alternative radio link to the line.

With the proposed solution, the customer may pay accordingly only when they want to use the actual service. However, the original functionality, the lighting functionality, of a lighting fixture are maintained in every case. The automatic deactivation also prevents misuse, since the decision to transmit information is taken in the lighting fixture itself and not externally. In addition, this means it is possible for a customer to also reactivate the transmission of position information at different times at any time.

LIST OF REFERENCE SIGNS

1, 1' lighting fixture
10 lamp
11 light source
20 modulatable supply circuit
20' non-modulatable supply circuit
21 supply output
22 supply input or mains voltage input
23 modulation input
24 modulator
25 converter
26 modulation signal
30 data stream generator
31 trigger input
32 data input
33 modulation output
34 encoder
35, 36 memory
37, 38 memory
40 trigger element
41 event signal input
42 clock input
43 data input
44 reset generator
45 credit counter
46 memory
47 logic
48 threshold-not-reached signal or credit counter non-zero signal
49 threshold-not-reached input or credit counter non-zero input
50 event generator
60 communication interface
61 data output
70 antenna or connection to gateway or network
71, 72 connections or interfaces to sensors
80 controller circuit
81 processor
83 memory
84, 85 memory areas
100 network
101 server
102 user terminal
601 gateway or interface
602 data processing arrangement
603 external device
S1, . . . , S7 method steps
S21, . . . , S30 method steps

The invention claimed is:

1. A lighting fixture, comprising:
an optoelectronic light source;
a modulatable supply circuit that is connected to the optoelectronic light source, wherein a current through or a voltage applied to the light source is modulatable by the modulatable supply circuit;
a data stream generator that is connected to a modulation input of the modulatable supply circuit; and
a trigger element that is connected to the data stream generator and configured to deliver a first signal to an input of the data stream generator in response to a comparison of a counter value with a threshold value,
wherein the data stream generator is configured to deliver a modulation signal to the modulation input in response to an event signal and/or the first signal, and the modulation signal encodes position information relative to a reference point.

2. The lighting fixture as claimed in claim 1, wherein the trigger element comprises at least one of the following elements:
a counter that provides the counter value and is changed by a fixed value after each first signal;
a timer circuit which outputs the counter value when a predefined time is reached; or
a comparison circuit with an input to receive the counter value and/or the event signal.

3. The lighting fixture as claimed in claim 1, wherein the data stream generator is configured to deliver a modulation signal to the modulation input in an absence of the first signal but in the presence of the event signal, wherein the modulation signal:
is a constant signal; or
comprises a signal which encodes a specified block of data; or encodes position information relative to a reference point, wherein the position information is less accurate than the position information in response to the first trigger signal.

4. The lighting fixture as claimed in claim 1, wherein the data stream generator comprises a memory wherein the position information and/or identification data for an identification of the lighting fixture is stored.

5. The lighting fixture as claimed in claim 1, wherein the data stream generator comprises a generator for generating a fixed predefined data stream, or a memory with a fixed predefined data stream stored therein.

6. The lighting fixture as claimed in claim 1, the lighting fixture further comprising a communication interface connected to the trigger element,
to set a counter in the trigger element to a predefined value in response to an external reset signal fed to the communication interface; or
to specify a time to a timer circuit in the trigger element.

7. The lighting fixture as claimed in claim 6, wherein the communication interface is coupled to the data stream generator and configured to receive a data stream fed to the lighting fixture.

8. The lighting fixture as claimed in claim 6, wherein the communication interface is configured to forward received data to the data stream generator, wherein
the data stream generator is configured to output the data received from the communication interface to the modulation input as the modulation signal.

9. The lighting fixture as claimed in claim 6, wherein the communication interface is configured for forwarding a request for the transmission of position information to the trigger element, wherein the trigger element is configured to check, on a basis of a parameter, whether to accept the request for the transmission of position information to the trigger element.

10. The lighting fixture as claimed in claim 1, further comprising a device for generating the event signal, wherein the device comprises at least one of the following:
a timer for providing the event signal periodically;
a motion detector or proximity sensor that provides the event signal when the distance from an object to the lighting fixture falls below a defined value; and
a light barrier that provides the event signal in the event of an interruption.

11. The lighting fixture as claimed in claim 1, wherein the trigger element is configured, in response to a presence of the event signal, to compare the counter value with the threshold value.

12. The lighting fixture as claimed in claim 1, wherein the functionality of the trigger element is realized by software code.

13. An arrangement comprising at least one lighting fixture, wherein each of the at least one light fixture comprises:
an optoelectronic light source;
a modulatable supply circuit that is connected to the optoelectronic light source, wherein a current through or a voltage applied to the light source is modulatable by the modulatable supply circuit;
a data stream generator that is connected to a modulation input of the modulatable supply circuit; and
a trigger element that is connected to the data stream generator and configured to deliver a first signal to an input of the data stream generator in response to a comparison of a counter value with a threshold value,
wherein the data stream generator is configured to deliver a modulation signal to the modulation input in response to an event signal and/or the first signal, and the modulation signal encodes position information relative to a reference point;
wherein each of the at least one lighting fixture comprises position information relative to the reference point, and wherein the arrangement further comprises a data processing arrangement which is coupled to each of the at least one lighting fixture for transmitting the threshold value.

14. The arrangement as claimed in claim 13, wherein the transmission of the threshold value and/or another transmission from the data processing arrangement to the at least one lighting fixture is encrypted.

15. A method for transmitting position information by modulation of a supply current or a supply voltage of a lamp, the method comprising:
detecting an event signal that indicates a transmission of position information;
evaluating, in response to the detected event signal, whether a trigger condition is satisfied, the trigger condition comprising at least one of the following:
checking whether a counter value has not yet reached a threshold value,
checking whether a counter value has not fallen below the threshold value, or
checking whether a certain time has not yet been reached or has been exceeded; and
if the trigger condition is satisfied, modulating a supply current or a supply voltage, wherein the modulation encodes data and the data contains position information, or
if the trigger condition is not satisfied, either
modulating a supply current or a supply voltage with a modulation corresponding to a specified data stream, or
ceasing modulation of a supply current or a supply voltage.

16. The method as claimed in claim 15, wherein detecting the event signal comprises at least one of the following:
detecting an approach of an object or a person to a region covered by the lamp;
detecting an interruption of a light barrier;
receiving a request for the transmission of position information;
reaching a defined time; or
expiry of a specified time period.

17. The method as claimed in claim 15, further comprising, if the trigger condition is satisfied:
changing the counter value by a fixed value.

18. The method as claimed in claim 15, wherein the specified data stream indicates to a user that the trigger condition is not satisfied.

* * * * *